Patented Aug. 14, 1951

2,564,001

UNITED STATES PATENT OFFICE 2,564,001

HYPOPHOSPHOROUS ACID AND HYPOPHOSPHITES AS CATALYZERS OF CONDENSATION OF MONOAMINO MONOCARBOXYLIC ACIDS

Michailas Genas, Paris, France, assignor to Société Organico, Paris, France, a corporation of France No Drawing. Application August 2, 1948, Serial No. 42,151. In France August 6, 1947

5 Claims. (Cl. 260—78)

It is known that polyamides may be obtained through the condensation, with elimination of water, of aminoacids in which the carboxyl group is separated from the amine group by more than 5 carbon atoms, or through similar condensation of dicarboxylic acids with diamines.

The polyamides are highly valuable industrial products usable in the manufacture of molded articles, films, threads, wires, textile and metal coatings, and similar uses.

The condensation reaction is effected by heating the polyamide generating substance or substances. In order to accelerate the reaction the addition of suitable catalysts has been advocated. The catalysts proposed for that purpose include: substances alkaline in character such as hydrated baryta, borax, and sodium bicarbonate; neutral substances such as zinc chloride, aluminum chloride, tin bichloride; and inert substances such as silica $SiO_2$.

It is known moreover that the addition of acids to the reaction mixture arrests the condensation reaction, as a result of blocking the amine function of the aminoacid monomers or polymers, this preventing the reaction from proceeding beyond a condensation degree which depends on the proportion of acid added to the reaction.

I have now found, according to my present invention, that condensation reactions of the above-defined character may be considerably accelerated through the use, as condensation catalysts, of predetermined proportions of phosphorus compounds which are adapted at the condensation temperatures to give out hydrogen phosphide, such as hypophosphorous acid and the salts thereof. Thus for example, hypophosphorous acid decomposes on heating according to the reaction

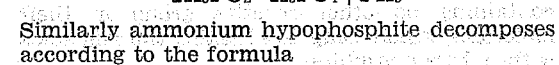

Similarly ammonium hypophosphite decomposes according to the formula

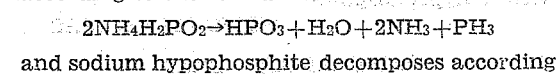

and sodium hypophosphite decomposes according to the equation

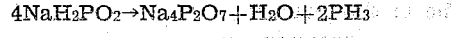

The following examples are given with the intention merely of illustrating the procedure of the invention and allow a clearer understanding of the latter, without in any way restricting the scope thereof.

The condensation tests to be described were effected in a bulbflask 500 cc. in capacity provided with three tubulations, placed in a bath of molten salt. The flask was provided with a thermometer dipping into the liquid reaction mixture, a mechanical agitator, an inlet tube for the feeding of nitrogen thereinto and an outlet tube followed by a descending refrigerator. 100 g. of materials to be condensed were placed into the flask and the air was evacuated with a slow current of nitrogen fed through the flask. This current of nitrogen was maintained throughout the full time of the condensation reaction. The reaction flask was maintained at a suitably selected temperature with an error less than $\pm 2°$ C. Samples were taken at regular intervals and the progress of the condensation reaction was checked by viscosity measurements made on solutions containing 0.5 g. of polymer in 100 cc. metacresol. The viscosity measurements were effected at 20° C. The viscosity values were expressed by the following equation:

$$V_i = \frac{Lt - Lt_0}{0.5}$$

wherein $Lt$ and $Lt_0$ represent the Napierian logarithms of $t$ and $t_0$, which in turn respectively designate the times of flow, in seconds, of the solution and of the solvent in the same viscosimeter tube and at the same temperature.

Although the examples presented deal with the condensation of 11-aminoundecylic acid, selected to typify the reaction and facilitate comparison of the progress of the condensation first in the absence of any catalyst (as a control), and then with various catalysts according to the invention, it will be understood that similar effects are obtained with other aminoacids or diacids and diamides capable of generating polyamides.

11-aminoundecylic acid was condensed in the above-described conditions first without any catalyst, and then with varying proportions of hypophosphorous acid expressed in mol per cent with respect to the aminoundecylic acid. The results of the viscosity measurements determined as defined hereinabove are included in the following table. The condensations were carried out at 218° C. $\pm$ 2° C.

Table I

| Catalyst | none | Hypophosphorous acid, mol per cent | | | |
|---|---|---|---|---|---|
| Hours | | 1.4 | 2.27 | 4.55 | 9.1 |
| ½ | | 0.69 | 0.64 | 0.53 | 0.46 |
| 1 | 0.72 | 0.80 | 0.68 | 0.59 | 0.58 } plastic mass |
| 3 | 0.86 | 1.06 | 0.81 | 0.81 | 1.32 |
| 5 | 0.97 | 1.22 | 1.43 plastic mass | 1.25 | Insoluble in metacresol. |
| 7 | | 1.32 | Insoluble in metacresol. | 1.47 | Plastic mass. |
| 8 | 1.06 | plastic mass | | Insoluble in metacresol. | |

With hypophosphorous acid, up to an amount of about 2 mol percent, an acceleration of the rate of reaction is observed during the first three hours of the condensation reaction, after that however a very sharp increase in viscosity is found to occur. Over a proportion of 2 mol per cent there is first observed, during the first three hours of heating, a reduction in the rate of condensation, then a very sharp increase in viscosity up to the point where products are obtained insoluble in metacresol and which, at the condensation temperatures used, present the appearance of a plastic mass rather than that of a fused product.

The action of hypophosphorous acid in the first stage of the condensation reaction probably manifests the accelerating action of the acidic H ion of the hypophosphorous acid when this acid is employed in a proportion up to 2 mol per cent. When more than 2 mol per cent are used in this first stage, there occurs a slowing down of the reaction due to a stabilizing effect resulting from blocking of the $NH_2$ groups. Thereafter, under the action of heat, the hypophosphorous acid decomposes according to the equation $$2H_3PO_2 \rightarrow H_3PO_4 + PH_3$$

and it is the $PH_3$ group which then acts to accelerate the condensation in the second stage of the reaction, that is after the end of about 3 hours' heating. The difference in physical aspect and the reduction in the metacresol-solubility of the polycondensate probably correspond with a structural modification of the polycondensate, which, it is believed, changes from a straight-chained to a branched or lattice structure.

Ammonium hypophosphite also accelerates the reaction rate, as is shown in the following example. 11-aminoundecylic acid was condensed in similar conditions as above with 1.2 mol per cent ammonium hypophosphite; the inherent viscosity values at the end of 1, 3 and 8 hours' heating respectively were 0.90, 1.22 and 1.89.

With 6 mol per cent ammonium hypophosphite, at the end of as little as half-an-hour heating the polycondensate is already found to be in the form of a plastic mass solidifying at ordinary room temperature, but devoid of any true melting point, in contradistinction from what is found to be generally the case with straight-chained or filamentary polyamides, and it does not dissolve in metacresol. Apparently, the polyamide formed is no longer exclusively formed of straight-chained or filamentary molecules, but comprises at least partially macromolecular lattices. It is also believed that the change from the filamentary to the lattice structure state is due to the action of the $PH_3$ formed by thermal decomposition of the ammonium hypophosphite, as in the case of hypophosphorous acid.

In the following table, there is set forth by way of a further example the progress of the condensation reaction of 11-aminoundecylic acid in the presence of 3 mol per cent sodium hypophosphite.

Table II

| Duration, hours | Intrinsic viscosity | Remarks |
|---|---|---|
| 2 | 1.00 | The reacting mass becomes opaque. |
| 5 | 1.20 | Opaque gelified mass. |

The improved accelerating agents described hereinabove are applicable to all kinds of polycondensation or copolymerization reactions capable of producing polyamides from aminoacids and mixtures thereof, or from diacids and diamines or mixtures of more than one diacid with more than one diamine, and also mixtures of aminoacids with diacids and diamines.

It will be understood moreover that rather than starting from the monomer materials the accelerator agents of the invention may be used to accelerate condensation of polyamides from a given degree of condensation to a higher degree of condensation.

What I claim is:

1. A method for producing polyamides by polycondensing polycondensable monoamino monocarboxylic acids containing no other reactive groups in their molecules, which comprises heating the said materials with a substance selected from the group consisting of hypophosphorous acid and the hypophosphites.

2. A method for producing polyamides by polycondensing polycondensable monoamino monocarboxylic acids containing no other reactive groups in their molecules, which comprises heating the said materials with hypophosphorous acid.

3. A method for producing polyamides by polycondensing polycondensable monoamino monocarboxylic acids containing no other reactive groups in their molecules, which comprises heating the said materials with a hypophosphite.

4. A method for producing polyamides by polycondensing primary monoamino carboxylic acids containing no other reactive group in their molecules, which comprises heating the said acids with hypophosphorous acid.

5. A method for producing polyamides by polycondensing primary monoamino carboxylic acids containing no other reactive group in their molecules, which comprises heating the said acids with a hypophosphite.

MICHAILAS GENAS.

REFERENCES CITED

The following references are of record in the file of this patent:

UNITED STATES PATENTS

| Number | Name | Date |
|---|---|---|
| 2,071,253 | Carothers | Feb. 16, 1937 |